United States Patent
Kangas

(10) Patent No.: US 6,689,231 B1
(45) Date of Patent: Feb. 10, 2004

(54) USE OF STAINLESS STEEL ALLOY AS UMBILICAL TUBES IN SEAWATER ENVIRONMENT

(75) Inventor: Pasi Kangas, Sandviken (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/598,241

(22) Filed: Jun. 21, 2000

(30) Foreign Application Priority Data

Jun. 21, 1999 (SE) ............................. 9902346

(51) Int. Cl.$^7$ ........................ C22C 38/44; F16L 11/14
(52) U.S. Cl. ................. 148/519; 138/131; 420/65; 420/67; 148/325
(58) Field of Search ................. 148/325, 327, 148/336, 519; 420/34, 56, 57, 67, 119, 122, 123, 65; 138/131; 174/47; 405/211.1

(56) References Cited

U.S. PATENT DOCUMENTS 5,582,656 A    12/1996  Kangas et al.
6,012,495 A  *  1/2000  Antonsen ................. 138/131

FOREIGN PATENT DOCUMENTS

EP    220141    9/1986
EP    534864    3/1993
GB   1513157    7/1978

OTHER PUBLICATIONS

Internet Archive Wayback Machine, http://web.archive.org/web/*/http://www.offshore-technology.com/projects/troika/index.htm accessed on Aug. 12, 2003.*
"Troika Gulf of Mexico, USA" obtained at http://www.offshore-technology.com/projects/troika/index.html, accessed on Jul. 16, 2002.*
"Gulf of Mexico Deepwater Continues to Shine As America's New Frontier" Mar. 5, 1998, obtained at http://www.mms.gov/ooc/press/1998/980305.pdf, accessed on Jul. 16, 2002.*
Sandvik SAF 2507, SAF 2304, SAF 2205 Duplex Stainless Steels Brochure, Nov. 1995.

* cited by examiner

Primary Examiner—Roy King
Assistant Examiner—Harry D Wilkins, III
(74) Attorney, Agent, or Firm—Burns, Doane, Swecker & Mathis, LLP

(57) ABSTRACT

The invention relates to a ferrite-austenitic alloy and its use, the alloy has a composition with a mixture defined as: C maximum 0.05%, Si maximum 0.8%, Mn 0.30–1.5%, Cr 28.0–30.0%, Ni 5.80–7.40%, Mo 2.00–2.50%, N 0.30–0.40%, Cu maximum 1.0%, W maximum 2.0%, S maximum 0.010%, 30–70% ferrite and the balance austenite for tubes filled with hydraulic fluid, as transport tubes for solutions for chemical injection, or another uses in the application of umbilicals.

7 Claims, 2 Drawing Sheets

USE OF STAINLESS STEEL ALLOY AS UMBILICAL TUBES IN SEAWATER ENVIRONMENT

FIELD OF THE INVENTION

The present invention relates to use of a stainless steel alloy, more particularly a ferritic-austenitic steel alloy for use in the shape of tubes intended for placement on the bottom of the sea, more particularly for exploitation of oil and gas deposits in the sea. The material according to the invention in such applications has to have good corrosion properties in aggressive chloride environments, good mechanical and physical properties, good fatigue properties as well as good compatibility with that types of fluids to be transported in the tubes. Tubes for this application are preferably manufactured as seamless hot extruded tubes.

BACKGROUND OF THE INVENTION

Nothing in the following discussion of the state of the art is to be construed as an admission of prior art.

In order to extract oil from the bottom of the sea, holes are drilled down from the bottom of the sea into the oil deposit. On the bottom of the sea, a unit for controlling the flow and the continuous transport of the crude oil to those units where the crude oil will be handled and refined to useable products or semi-finished products, will be installed. The unit on the bottom of the sea has components such as valves which shall control the taking-up/pressure/flowrate etc., couplings and tubes which allow injection of chemicals down into the oil well. Often, methyl alcohol is injected for the purpose of preventing the crude oil from coagulating and causing unwanted stoppages in the production pipe.

The valves and the couplings are steered hydraulically or electrically from a platform, a production vessel or another unit at sea level of the sea or on land. A so-called umbilical connects the steering unit with the units on the bottom of the sea. That part of the umbilical that lies on the bottom of the sea, for instance between two undersea units at different extraction places, are called static umbilicals because these are subjected to movement on a relatively insignificant scale effected by the sea movements. That part of the umbilical, which is situated between the bottom of the sea and sea level is called dynamic umbilical and is to a great extend effected by the movements in the water and on sea level. Examples of such movements are currents in the water, movements of the platform/productionvessel and undulatory motions.

FIG. 1 shows a conventional umbilical tube 1 laid down on the bottom of the sea extending from a platform 2 which lies anchored on the level of the sea 3. In this umbilical, a number of tubes 4 are gathered together for hydraulic and electric control, together with a central tube for the injection of chemicals such as methyl alcohol. The umbilical could have different configurations dependent on the demands of service for the units on the bottom of the sea, but usually there is a bigger tube in the center for the injection of methyl alcohol with thinner tubes twisted around this. A cover 6 of plastic can be used to gather the umbilical tubes and make the entirety manageable for laying and installation.

The tubes 4, 5 in the umbilical tubes must be resistant to corrosion and have good mechanical properties. The tube material has to be resistant to corrosion in seawater, which surrounds the outer surface of the tubes. This property is considered to be the most important since seawater could be very corrosive to stainless steel. Furthermore, the material has to have a high corrosion resistance against the possibly corrosive solutions, which are be injected into the oil spring. The material has to be compatible with the hydraulic fluids, which are used for the hydraulic control without contaminating the fluid. Impurities in the hydraulic fluid could negatively influence the service function at the control unit on the bottom of the sea.

The mechanical properties of the material used to construct the umbilical tubes are very important. Since the depth can be considerable at the place for the oil extraction, the dynamic part of the umbilical becomes generally long and thereby heavy. This weight has to be carried by the platform or the floating production vessel. If the umbilical is made lighter, the available net lift could be used for other purposes than to lift the umbilical. In practice there are two different ways to reduce the weight of an umbilical with a determined configuration. A lighter material could be chosen or a material with the same density but higher yield point and tensile strength. By choosing a material with higher strength, tubes with thinner walls could be used and the total mass of the umbilical can be reduced. The deeper the sea at the extraction place, the longer the umbilical, and the more important the total weight per meter umbilical of the material.

Besides good corrosion properties and high strength, good fatigue strength properties are desirable. This is especially true for the dynamic part of the umbilical, which will be affected by the movements of the water and the floating unit to a large extent.

The general requirements for an umbilical can be summarized as follows:

Content of Fe: 35–55%

PRE (Cr+3.3Mo+16N): minimal 40

Yield point in tension Rp0.2 min=650 MPa.

Tensile strength Rm=800–1000 MPa.

Elongation A5 min 25%

Testing temperature acc. to ASTM G48A min 50° C.

Testing temperature acc. to ASTM G48B min 35° C.

Weldability

Good fatigue resistance

Until now, the most frequently used material for umbilicals has been a ferritic-austenitic stainless steel under the name Sandvik SAF 2507 and which is standardized under the designation UNS S32750. Until now this material has been well proven its ability to meet the corrosion resistance and strength requirements. This steel alloy is described in greater detail in the European Patent EP-A-220141, the disclosure of which is incorporated herein by reference in its entirety.

SUMMARY OF THE INVENTION

Accordingly, it is an object of the present invention to improve the performance of the above-mentioned components, including transport tubes, umbilicals and the like.

According to one aspect, there is provided a ferrite-austenitic alloy with a mixture defined as: C maximum 0.05%, Si maximum 0.8%, Mn 0.30–1.5%, Cr 28.0–30.0%, Ni 5.80–7.40%, Mo 2.00–2.50%, N 0.30–0.40%, Cu maximum 1.0%, W maximum 2.0%, S maximum 0.010%, 30–70% ferrite and the balance austenite for tubes filled with hydraulic fluid, as transport tubes for solutions for chemical injection, or another use in the application umbilicals.

DETAILED DESCRIPTION

Figure 1:
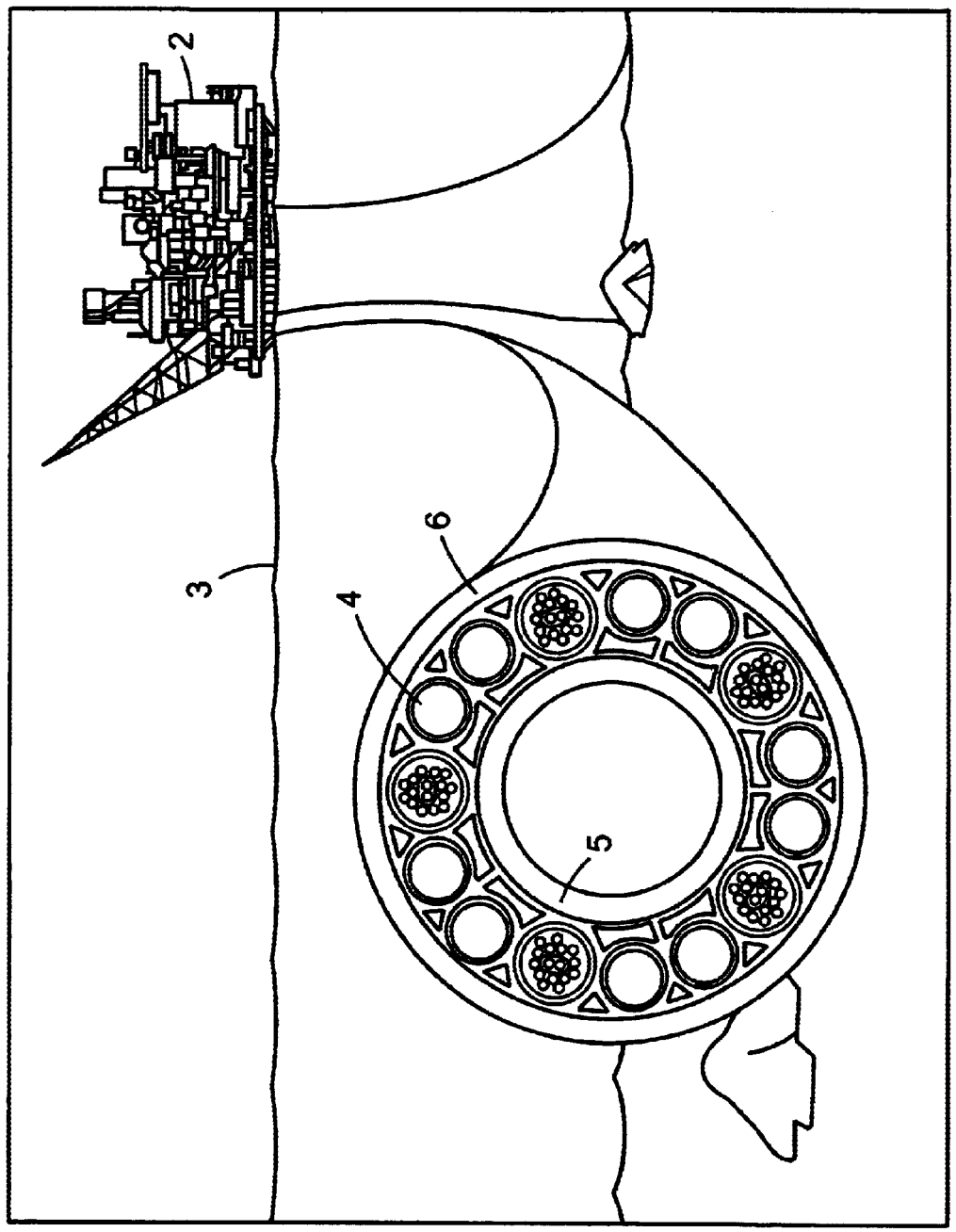
FIG. 1 is a schematic illustration of an umbilical tube arrangement.

According to the present invention, it has surprisingly been shown that one can obtain a tube material with increased yield point in tension and increased tensile strength, while at the same time maintaining good ductility and good pitting corrosion properties, by increasing the content of the alloy elements Cr, N, and also providing an adequate content of Mo, to achieve a super duplex alloy, which after hot extrusion to seamless tubes will be cold rolled to the required final dimension, and after that finally annealed at an accurately selected level of temperature.

Preferred examples of this type of material for applications such as umbilical tubes, and comparative tests, will be given in detail in the following.

EXAMPLE 1

An experimental material for purposes of comparison was manufactured by casting of 170 kg billet, theses were hot forged to round bars with a diameter of 126 mm and then hot extruded to form seamless tubes with a dimension of 48×5 mm, and also cold rolled to a dimension of 31×3 mm. The final annealing was executed at 1040° C., for 5 minutes followed by water quenching. The compositions of these mixture appear in Table 1. The alloys of Table 1 provide a comparative example, and which indicate that material like this, which are known from U.S. Pat. No. 5,582,656, generally do not comply to the requirements of the application in question.

TABLE 1

Mixture of experimental material, weight-%

| Charge | C | Si | Mn | P | S ppm | Cr | Ni | Mo | N |
|---|---|---|---|---|---|---|---|---|---|
| 654667 | 0.016 | 0.19 | 1.02 | 0.010 | 49 | 29.37 | 8.62 | 1.55 | 0.26 |
| 654668 | 0.015 | 0.19 | 0.99 | 0.009 | 46 | 29.30 | 8.84 | 2.03 | 0.25 |
| 654669 | 0.015 | 0.19 | 0.91 | 0.010 | 43 | 29.26 | 8.00 | 2.07 | 0.31 |
| 654670 | 0.015 | 0.19 | 0.88 | 0.011 | 30 | 29.08 | 9.09 | 2.57 | 0.26 |
| 654671 | 0.016 | 0.16 | 1.01 | 0.012 | 32 | 28.81 | 7.48 | 2.50 | 0.37 |
| 654672 | 0.015 | 0.15 | 1.00 | 0.012 | 36 | 29.01 | 6.66 | 2.51 | 0.40 |
| 654674 | 0.016 | 0.16 | 0.88 | 0.011 | 32 | 29.92 | 9.38 | 1.57 | 0.26 |
| 654675 | 0.016 | 0.16 | 0.92 | 0.012 | 35 | 30.39 | 7.74 | 1.50 | 0.39 |
| 654676 | 0.017 | 0.17 | 1.03 | 0.011 | 35 | 30.50 | 6.94 | 1.53 | 0.40 |
| 654678 | 0.017 | 0.17 | 0.99 | 0.011 | 31 | 30.11 | 9.62 | 2.01 | 0.26 |
| 654679 | 0.016 | 0.16 | 0.89 | 0.012 | 38 | 30.15 | 7.95 | 2.08 | 0.35 |
| 654680 | 0.016 | 0.16 | 0.87 | 0.012 | 42 | 30.51 | 6.20 | 2.08 | 0.44 |
| 654683 | 0.016 | 0.16 | 0.96 | 0.011 | 38 | 30.15 | 8.11 | 2.56 | 0.35 |
| 654684 | 0.015 | 0.15 | 0.91 | 0.011 | 44 | 30.61 | 5.71 | 2.57 | 0.48 |

The experimental materials were tested for pitting corrosion in 6% FeCl according to ASTM G48C, but at a starting temperature of 40° C. and with steps of 5° C. until pitting corrosion attacks were obtained. The temperature, when this occurs first is called Critical Pitting corrosion Temperature (CPT).

Elongation tensile testing was also conducted at room temperature. The results of this test appear in Table 2.

TABLE 2

Result of the corrosion test accordant to ASTM G48C and also tensile test of seamless tubes dimensioned 31 × 3 mm.
The average of two tests per charge is given.

| Charge | CPT (° C.) | RpO2 (Mpa) | Rm (Mpa) | A5 (%) |
|---|---|---|---|---|
| 654667 | 40 | 635 | 861 | 32 |
| 654668 | 40 | 646 | 867 | 31 |
| 654669 | 62.5 | 665 | 885 | 34 |
| 654670 | 55 | 666 | 882 | 30 |
| 654671 | 75 | 687 | 908 | 32 |
| 654672 | 75 | 694 | 912 | 35 |
| 654674 | 53.8 | 667 | 879 | 31 |

TABLE 2-continued

Result of the corrosion test accordant to ASTM G48C and also tensile test of seamless tubes dimensioned 31 × 3 mm.
The average of two tests per charge is given.

| Charge | CPT (° C.) | RpO2 (Mpa) | Rm (Mpa) | A5 (%) |
|---|---|---|---|---|
| 654675 | 65 | 689 | 914 | 35 |
| 654676 | 60 | 698 | 903 | 35 |
| 654678 | 45 | 678 | 890 | 34 |
| 654679 | 75 | 692 | 916 | 35 |
| 654680 | 60 | 695 | 914 | 35 |
| 654683 | 65 | 715 | 926 | 33 |
| 654684 | 60 | 702 | 932 | 33 |

EXAMPLE 2

A material was manufactured by AOD-manufacturing, hot extrusion, hot rolling to round bars with a diameter of 126 mm, extrusion of seamless tubes to a dimension of 33.2×3.5 mm and also cold rolling to a dimension of 15.2×1.2 mm. The annealing was executed at two different temperatures, 1020° C. and 1060° C., holding time 2 minutes, followed by water quenching.

The mixture of the material appears from Table 3. The mixture of this material lies within the scope of the present invention.

TABLE 3

Mixture of the tested material, weight-%.

| C | Si | Mn | P | S | Cr | Ni | Mo | N | Ca |
|---|---|---|---|---|---|---|---|---|---|
| 0.021 | 0.27 | 0.90 | 0.016 | 0.001 | 28.80 | 6.62 | 2.20 | 0.38 | 0.0026 |

The material was examined for pitting corrosion partially in artificial seawater at increased potential (see table 4), partially in 6%FeCl$_3$ (see table 5), which is often used for acceptance testing of high alloyed stainless steel materials and is specified in ASTM G48 standard. In those tests the material was examined in its final shape, i.e. rolled in a pilgrim step rolling mill and annealed, with the surface stripground after annealing. No further grinding of the inner and outer surface was undertaken before the testing. The results show that the material in this shape has pitting corrosion properties surely in alignment with that of the SAF 2507 material.

TABLE 4

Critical pitting corrosion temperature of umbilical tubes according to the invention in artificial seawater at +600 mV SCE of material with different final annealing temperatures (1020° C. and 1060° C.).

| Test | CPT (° C.) 1 | CPT (° C.) 2 | CPT (° C.) 3 | CPT (° C.) 4 | CPT (° C.) 5 | CPT (° C.) 6 | CPT (° C.) average | S (° C.) |
|---|---|---|---|---|---|---|---|---|
| 1 (1060° C.) | 75 | 75 | 70 | 75 | 75 | 70 | 73 | 3 |
| 2 (1020° C.) | 65 | 65 | 70 | 65 | 65 | 70 | 67 | 3 |

TABLE 5

Critical pitting corrosion temperature (CPT) of
umbilical tubes in 6% FeCl₃ (ASTM G48 test)
of material with different final annealing
temperatures (1020° C. and 1060° C.).

| Test | CPT (° C.) test 1 | CPT (° C.) test 2 |
|---|---|---|
| 1 (1060° C.) | 75 | 75 |
| 2 (1020° C.) | 65 | 65 |

Tubes with dimensions around 10–20 mm inner diameter are usually used in an umbilical. For the steel grade SAF 2507 having these dimensions a yield point in tension of 650 MPa and a tensile strength of 850 MPa are used as those values which can be guaranteed, and are used for design calculations on the umbilical. The tubes which are manufactured with a corresponding method in the steel grade having a composition according to the present invention and with corresponding dimensions, surprisingly exhibit a yield point in tension over 850 MPa and a tensile strength over 1000 MPa with retained ductility, A min. 25% (see Table 5).

To meet the minimum demand of elongation, a final annealing temperature of 1060° C. may be preferred, while a final annealing temperature of 1020° C. implies that the minimum request for elongation certainly cannot meet the requirements. Those results indicate that the tube wall according to the present invention can be reduced by 20–25% compared with a SAF 2507 tube for the same application and still meet all performance requirements. By way of example, an umbilical of 2 km in length with 12 tubes in the configuration, such reduction of the wall thickness could impart a very considerable total weight reduction.

TABLE 6

Values for the strength of umbilical tubes
of a dimension of 15.1 × 1.2 mm at room
temperature and two different annealing
temperatures (1020° C. and 1060° C.).

| | $R_{p0.2}$ (Mpa) | $R_m$ (Mpa) | A (%) |
|---|---|---|---|
| 1060° C. | | | |
| 1 | 876 | 1021 | 27.6 |
| 2 | 882 | 1029 | 28.1 |
| 3 | 893 | 1059 | 27.5 |
| 4 | 891 | 1043 | 27.2 |
| 5 | 912 | 1070 | 27.6 |
| 6 | 883 | 1039 | 27.2 |
| average | 890 | 1044 | 27.5 |
| 1020° C. | | | |
| 1 | 892 | 1036 | 24.5 |
| 2 | 887 | 1026 | 23.6 |
| 3 | 886 | 1033 | 25.0 |
| 4 | 894 | 1032 | 26.6 |
| 5 | 900 | 1035 | 24.1 |
| 6 | 889 | 1024 | 26.4 |
| average | 891 | 1031 | 25.0 |

An annealing temperature of 1060° C. appears more favorable than an annealing temperature of 1020° C. The critical pitting corrosion resistance is higher for material annealed at 1060° C. and the average for the elongation at tension testing is also the highest for material annealed at 1060° C. However, it is noted that a material annealed at 1020° C. passes the demand of at least 25% elongation, which is the requested performance for the present umbilical material. A suitable annealing temperature for the material is around 1060° C., preferably in the range between 1040–1080° C.

The tube material was welded to butt with the help of 0.8 mm TIG-wire with a similar mixture as the basic material. As protective gas under the welding Ar+3%N₂ as used. The mixture for the filler material appears from Table 7.

TABLE 7

Mixture of the TIG-wire used in the welding-test.

| C | Si | Mn | P | S | Cr | Ni | Mo | N |
|---|---|---|---|---|---|---|---|---|
| 0.013 | 0.23 | 1.15 | 0.018 | 0.001 | 29.49 | 8.03 | 2.51 | 0.30 |

Material was exposed to a tensile test according to ASTM G48C with a start temperature of 40° C. and steps of 5° C. The results appear in Table 8.

TABLE 8

Result of the tensile test and pitting corrosion test
(Critical pitting corrosion temperature according to
ASTM G48C) of butt-welded tubes with two different
annealing temperatures for the tube material.

| | CPT (° C.) | $R_{PO2}$ (Mpa) | $R_m$ (Mpa) | A5 (%) |
|---|---|---|---|---|
| 1020° C. | 40° C. | 873 | 1056 | 15.3 |
| 1060° C. | 42.5° C. | 859 | 1057 | 16.4 |

Figure 2:
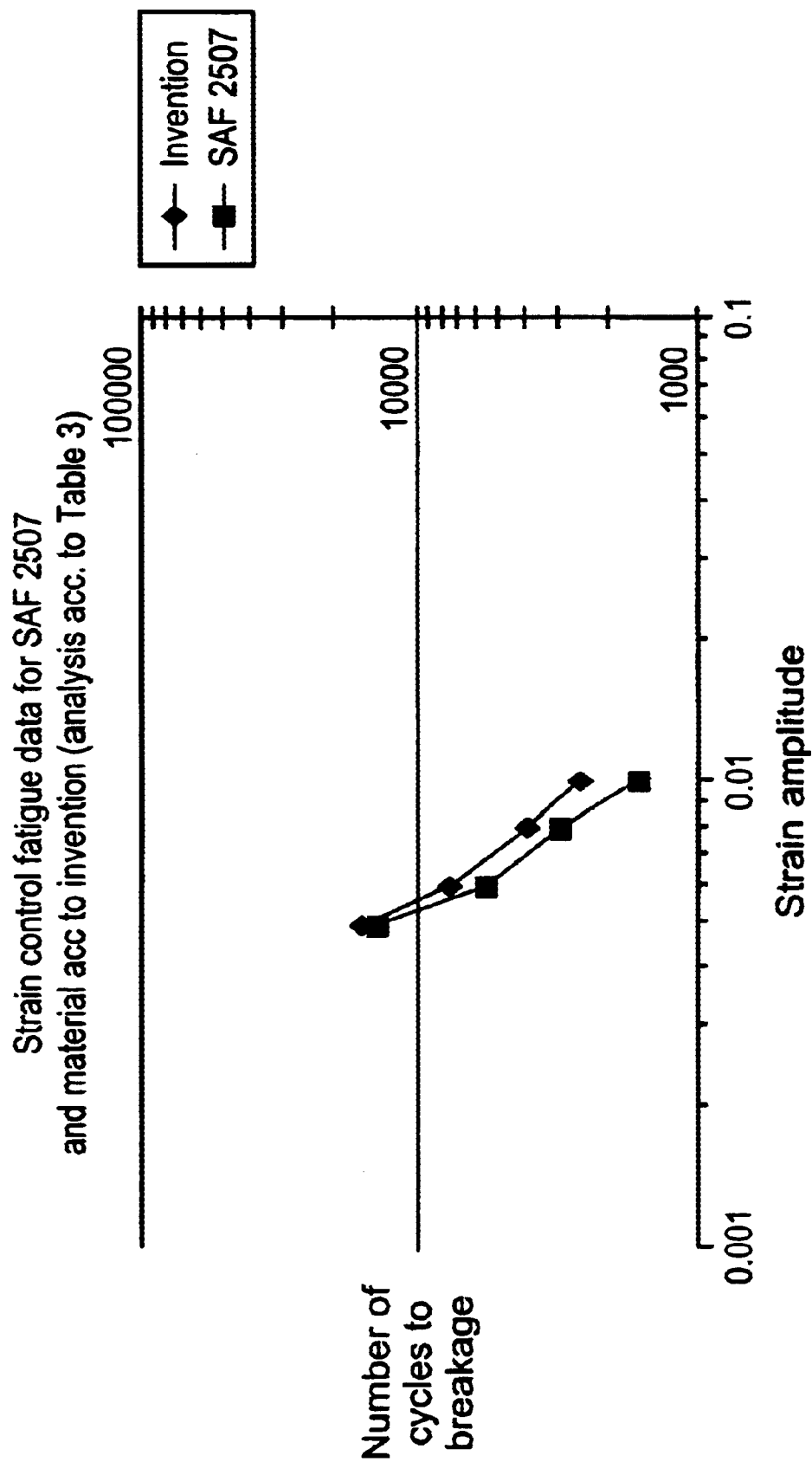
FIG. 2 is a chart of the results of the elongation testing.

The strain control fatigue properties for the material were studied and compared with those of other high alloyed stainless steels. The tests were performed as strain controlled with changing load with a sinusoidal wave shape and an average elongation rate of $5 \times 10^{-3} S^{-1}$. The results appear in FIG. 2.

Based on the above, it was determined that a material which is most suitable for the above mentioned final annealing and for application as an umbilical tube, should have a composition limited to C maximum 0.05%, Si maximum 0.8%, Mn 0.30–1.5%, Mo 2.0–2.5%, Cr 28.0–30.0%, Ni 5.80–7.40%, N 0.30–0.40%, Cu maximum 1.0%, W maximum 2.0%, S maximum 0.010%, and the remainder Fe and normally occurring impurities, wherein the Fe is composed of 30–70% ferrite and the balance austenite. After final cold rolling the tubes are subjected to a final annealing at 1040–1080° C. for a time of 3–10 minutes, followed by a water quenching.

It appeared that the steel of the present invention has fatigue properties in the same range as SAF 2507. The strain control fatigue properties indicate how much and how many times a material can be subjected for extension before a strain fatigue raise in the material. Since the umbilical tubes will be welded together to form long lengths, coiled on drums before they are twisted into the umbilical, it is not unusual that a number of work cycles will be done where a certain plastic deformation occurs, before the umbilical is used. However, the risk for breakage as a consequence of strain fatigue in an umbilical tube constructed of a material according to the present invention is almost nonexistent.

The steel according to the above mentioned analysis contains properties, which make it excellently suited for application as umbilical tubes. The material has a high corrosion resistance in sea water owing to its high PRE-number and is compatible to most hydraulic and process fluids currently used, which are transported in the different tubes of the umbilical. The high strength of the material enables considerable reduction of the wall thickness compared with the most common materials for this application today, such as SAF 2507. The weight saving in the umbilical is of extreme importance for oil mining in large ocean depths, which is becoming more and more common.

Butt welding of the tubes together end-to-end works satisfactorily, which is a demand for the production of umbilicals. The fatigue properties show that the risk for strain reduced fatigue breakdown is almost nonexistent.

The principles, preferred embodiments and mode of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A method of using an alloy, the alloy having a composition comprising, in wt. %: C maximum 0.05%, Si maximum 0.8%, Mn 0.30–1.5%, Cr 28.0–30.0%, Ni 5.80–7.40%, Mo 2.00–2.50%, N 0.30–0.40%, Cu maximum 1.0%, W maximum 2.0%, S maximum 0.010%, 30–70% ferrite and the balance austenite, and an average proof strength of at least approximately 890 MPa, the method comprising forming a tube from the alloy, and incorporating the tube into an umbilical for a deep sea oil exploration control unit.

2. The method of claim 1, wherein the tube carries at least one of hydraulic fluid and chemical solutions, and wherein the tube is subjected to corrosion from salt water.

3. The method of claim 1, wherein the alloy exhibits a yield point in tension in seamless tubes of at least 750 MPa and at the same time an elongation of at least 25%.

4. The method of claim 1, wherein the alloy exhibits a yield point in tension for seamless tubes of at least 850 MPa and at the same time an elongation of at least 25%.

5. The method of claim 1, further comprising butt-welding a plurality of tubes together and coiling the connected tubes about a cylinder.

6. The method of claim 1, wherein the alloy is hot extruded to form a seamless tube, cold rolled and subjected to annealing at a temperature of 1040–1080° C. for 3–10 minutes, and water quenched.

7. An umbilical for a deep sea oil exploration control unit comprising at least one tube, the tube formed from an alloy material comprising, in wt. %: C maximum 0.05%, Si maximum 0.8%, Mn 0.30–1.5%, Cr 28.0–30.0%, Ni 5.80–7.40%, Mo 2.00–2.50%, N 0.30–0.40%, Cu maximum 1.0%, W maximum 2.0%, S maximum 0.010%, 30–70% ferrite and the balance austenite, and an average proof strength of at least approximately 890 MPa.

* * * * *